(No Model.)
B. FREEMAN.
POTATO DIGGER.
No. 299,468. Patented May 27, 1884.
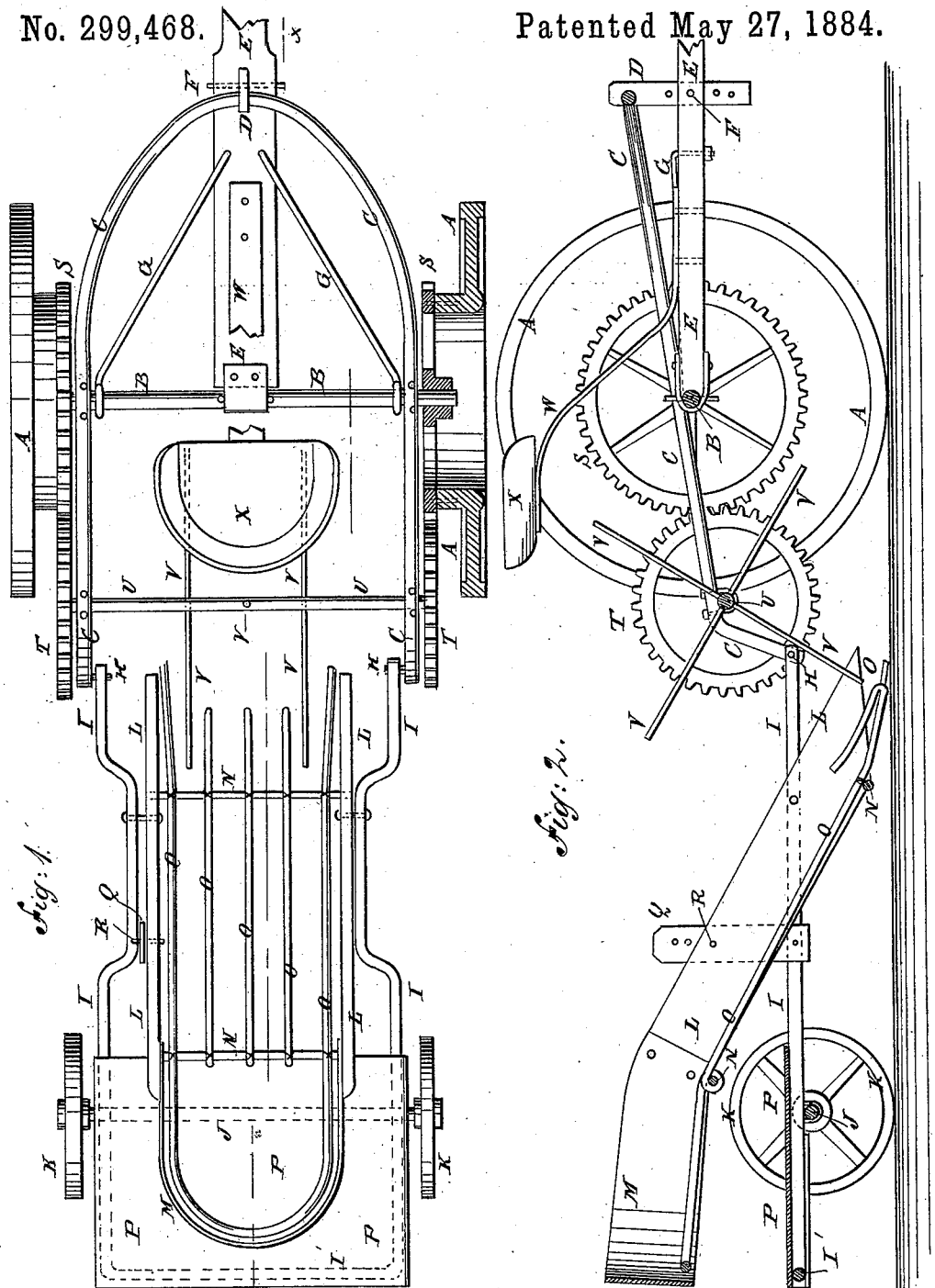
WITNESSES:
Chas. Nida
C. Sedgwick
INVENTOR:
B. Freeman
BY Munn & Co
ATTORNEYS.

UNITED STATES PATENT OFFICE.

BALTUS FREEMAN, OF FACTORYVILLE, PENNSYLVANIA.

POTATO-DIGGER.

SPECIFICATION forming part of Letters Patent No. 299,468, dated May 27, 1884.

Application filed January 31, 1884. (No model.)

*To all whom it may concern:*

Be it known that I, BALTUS FREEMAN, of Factoryville, Wyoming county, Pennsylvania, have invented a new and useful Improvement in Potato-Diggers, of which the following is a full, clear, and exact description.

Reference is to be had to the accompanying drawings, forming part of this specification, in which similar letters of reference indicate corresponding parts in both the figures.

Figure 1 is a plan view of my improvement, partly in section; and Fig. 2 is a sectional side elevation of the same, taken through the broken line $x$ $x$, Fig. 1.

The object of this invention is to facilitate the digging of potatoes and promote convenience in adjusting and controlling potato-diggers.

The invention consists in a potato-digger constructed with a carriage hinged at the forward end of its frame to the rear end of the frame of a second carriage, and provided with a platform and an adjustable frame carrying a screen, whereby the potatoes will be raised from the ground, separated from the soil, and delivered into a basket or bag. To the frame of the forward carriage is journaled a shaft provided with radial rods and driven by gear-wheels from the drive-wheels of the said carriage, whereby the soil will be loosened in advance of the digging and separating screen, as will be hereinafter fully described.

A are the drive-wheels, to the axle B of which is attached the frame C. The forward part of the frame C is bowed, and to it is hinged a bar, D, which passes down through a short slot in the tongue E, and is perforated to receive a pin, F, passing through it and through the said tongue. Several holes are formed through the bar D to receive the pin F, so that any desired inclination can be given to the said frame C. The rear end of the tongue E is secured to the center of the axle B, and the connection between the said tongue and axle is strengthened by the braces G, the forward ends of which are attached to the said tongue, and their rear ends are attached to the end parts of the said axle. The rear ends of the side bars of the frame C are bent downward, and to them are hinged, by pins H or other suitable means, the forward ends of the bars I, the rear parts of which are attached to the axle J of the small wheels K. The rear ends of the bars I project in the rear of the axle J, and are connected by a bar, I', formed solid with or attached to them. Upon the middle parts of the side bars I are formed long inward offsets, to which are pivoted the forward parts of the side bars L. The forward ends of the side bars L are beveled up on the lower side, and to the rear ends of the said side bars are attached the ends of a semi-annular guard-band, M.

To the side bars L are attached the ends of the cross-bars N of the screen, the longitudinal bars O of which project at their forward ends to pass beneath the potatoes and soil of the hills, so that as the machine is drawn forward the potatoes will pass up the screen N O, and the soil will fall through the said screen to the ground. The potatoes drop from the rear end of the screen N O into a basket placed upon a platform, P, secured to the rear part of the frame I I' and carried by the wheels K.

To one or both the side bars I is attached an upwardly-projecting bar, Q, through which and through the side bars L is passed a pin, R, to support the said side bars and the screen N O in position. Several holes are formed in the bar Q to receive the pin R, so that the inclination of the said screen can be readily regulated.

To the inner sides of the drive-wheels A are attached large gear-wheels S, the teeth of which mesh into the teeth of smaller gear-wheels, T, attached to the ends of a shaft, U. The shaft U revolves in bearings in the rear parts of the side bars of the frame C, a little above the downward bends of the said side bars.

To the shaft U are attached a number of radial rods, V, which are made of such a length that their ends will enter the hills and loosen the soil, so that the ends of the longitudinal bars of the screen will pass through the said soil easily.

To the rear part of the tongue E is attached the lower end of the spring-standard W, to the upper end of which is attached the driver's seat X.

Having thus described my invention, I claim as new and desire to secure by Letters Patent—

1. In a potato-digger, the combination, with a carriage, A B C, of the carriage I J K, having a platform, P, and the pivoted frame L M and screen N O, substantially as herein shown and described, whereby the potatoes will be raised from the ground, separated from the soil, and delivered into a basket or bag, as set forth.

2. In a potato-digger, the combination, with the two carriages A B C and I J K and the frame L M and screen N O, of the gear-wheels S T and the shaft U, having radial rods V, substantially as herein shown and described, whereby the soil is loosened in advance of the said screen, as set forth.

BALTUS FREEMAN.

Witnesses:
N. S. FREEMAN,
FRED. W. GÜNSTER,
FRED. FULLER.